(12) United States Patent
Asquith et al.

(10) Patent No.: US 7,169,426 B2
(45) Date of Patent: *Jan. 30, 2007

(54) FREEZING VEGETABLES

(75) Inventors: Michael Harry Asquith, Bedford (GB);
Elliott Kirk, Bedford (GB); Mark Kirkland, Bedford (GB); Stephen Matthew Morrey, Bedford (GB); Andrew Paul Ormerod, Bedford (GB); Julie Debra Ralfs, Bedford (GB); David George Sharp, Bedford (GB); Christopher Michael Sidebottom, Bedford (GB)

(73) Assignee: Unilever Bestfoods, North America division of Conopco. Inc., Englewood Cliffs, NJ (US)

( * ) Notice: Subject to any disclaimer, the term of this patent is extended or adjusted under 35 U.S.C. 154(b) by 524 days.

This patent is subject to a terminal disclaimer.

(21) Appl. No.: 10/117,429

(22) Filed: Apr. 5, 2002

(65) Prior Publication Data

US 2003/0096046 A1    May 22, 2003

(30) Foreign Application Priority Data

Apr. 9, 2001  (EP) .................................. 01303335

(51) Int. Cl.
*A23L 3/36* (2006.01)

(52) U.S. Cl. .................... 426/508; 426/509; 426/520; 426/524; 62/62

(58) Field of Classification Search ................ 426/524, 426/615, 506, 508, 509, 520–521; 62/56, 62/62

See application file for complete search history.

(56) References Cited

U.S. PATENT DOCUMENTS

| 3,136,642 A | * | 6/1964 | Backinger et al. .......... 426/327 |
| 3,408,208 A | | 10/1968 | Lamb |
| 3,736,154 A | | 5/1973 | Finkle |
| 4,632,834 A | | 12/1986 | Barnes |
| 5,244,674 A | | 9/1993 | Cadas et al. |
| 5,447,734 A | * | 9/1995 | Street .......................... 426/268 |
| 5,607,712 A | | 3/1997 | Bourne |
| 6,096,361 A | * | 8/2000 | Yamane et al. ............. 426/524 |

FOREIGN PATENT DOCUMENTS

| EP | 157 442 | 10/1985 |
| EP | 0 554 468 | 8/1993 |
| EP | 1 249 171 | 10/2002 |
| GB | 1083817 | 9/1967 |
| GB | 2 263 617 | 8/1993 |
| JP | 62201565 | 9/1987 |
| JP | 05161449 | 6/1993 |
| JP | 08140670 | 6/1996 |
| JP | 2000253812 | 9/2000 |
| JP | 2002209545 | 7/2002 |
| WO | 91/01635 | 2/1991 |

OTHER PUBLICATIONS

"Production of Firmer-Textured Canned and Frozen Tropical Fruit and Vegetables" by Seow et al., Asean Food Journal, vol. 6, No. 3, 1991, pp. 104-108.
"Frozen Food Technology" by Mallett (Ed), 1993, p. 7.
"Freezing Effects on Food Quality" by L.E. Jeremiah (Ed), 1996, Marcel Dekker, New York, p. 2.
"Low-Temperature Preservation of Foods and Living Matter" by O.R. Fennema, W.D. Powrie and E.H. Marth, 1973, Marcel Dekker, New York, pp. 352-385.

* cited by examiner

*Primary Examiner*—Drew Becker
(74) *Attorney, Agent, or Firm*—Michael P. Aronson

(57) ABSTRACT

The present invention relates to a process for the production of a frozen vegetable or part thereof, wherein said process comprises the steps:
  (i) heat-treating a vegetable or part thereof;
  (ii) under-cooling to a maximum core temperature of less than or equal to −5° C.;
  (iii) reducing the core temperature to less than or equal to −18° C.;

The invention also provides a frozen vegetable or part thereof comprising a core ice content, characterised in that at least 40% of said core ice content is located within a plurality of cellular structures, wherein the perimeter of each cellular structure is defined by a cell wall.

5 Claims, 10 Drawing Sheets

FREEZING VEGETABLES

FIELD OF THE INVENTION

The invention relates to a process for freezing vegetables and the frozen vegetables provided thereby. More particularly the invention relates to a novel freezing process which provides frozen vegetables of excellent quality when defrosted for consumption.

BACKGROUND OF THE INVENTION

Various attempts have been disclosed in the art to improve the quality of vegetables which have been stored frozen by way of the freezing process applied.

U.S. Pat. No. 3,736,154 describes a process of ultraslow freezing which discloses the maintenance of intact cell membranes in the product by way of a freezing regime with a cooling rate of about 0.1 to 0.3° C. per hour. This process is disclosed as achieving dehydration of the inner cell as water within the cell moves outside the cell membrane where it freezes without the destruction of the cell membrane.

Unfortunately this process is not a viable approach to the commercial preparation of frozen vegetables. Not only does this process not tolerate a blanching step which is necessary as a microbiological and enzyme deactivation step in modern vegetable processing, but also this process takes several days to complete.

U.S. Pat. No. 6,096,361 discloses a similar method of preservation wherein food is relatively rapidly cooled from room temperature to close to the freezing point and then slowly cooled at a gradual cooling rate of 0.01 to 0.5° C./hour to below the freezing point. This non-frozen preservation method may be then followed by a rapid freezing treatment to achieve a food wherein the outer cells of the food are frozen and the inner cells preserved in a non-frozen state. It is disclosed that free water moves from the intracellular fluid to the extra cellular fluid, resulting in the simultaneous dilution of the extra cellular fluid and concentration of the intracellular fluid, which makes it easier for the extra cellular fluid to freeze and, conversely, more difficult for the intracellular fluid to freeze.

An alternative freezing process of the prior art for improving frozen vegetable quality is described in European Patent 0 554 468 B1 in which potatoes are cooked and frozen. Freezing is described as a 2 step process wherein, in an initial step, the core of the potatoes is kept at the crystallisation stage of water for a period of 15 to 60 minutes. In a second step deep-freezing is continued until a storage temperature of −20° C.

The present invention also addresses the technical problem of providing high quality frozen vegetables to the consumer, and more particularly to provide frozen vegetables which, when thawed, give rise to a product texture and appearance which closely resembles that of fresh vegetables.

The applicants believe that a significant cause of texture loss in frozen vegetables is as a result of tissue damage resulting from extracellular ice formation, therefore the problem of the invention is more particularly identified as providing a reduction in extracellular ice formation during freezing.

The solution to this problem provided by the present invention resides in a novel freezing process which can practically eliminate ice formation outside the cell wall of the vegetable tissue and so provide a texture, appearance and thus product quality that was not previously possible in frozen vegetables.

TEST OF THE DEFINITIONS

Under-cooling refers to the reduction of the temperature of the vegetable or part thereof to a temperature below the freezing point (i.e. the temperature at which freezing is possible) without the formation of ice crystals occurring.

The core refers to that part of the vegetable or part thereof which is at least 5 mm from the external air contact surface. Preferably the core refers to that part of the vegetable or part thereof which is at least 10 mm from the external air contact surface, most preferably at least 15 mm therefrom.

Extra-cellular ice is an expression used herein to define ice formed outside the confines of cellular structures, wherein the perimeter of each cellular structure is defined by a cell wall. It therefore follows that for the purpose of the present invention intra-cellular ice refers to ice formed within the confines of said cellular structures i.e. within the confines of a cell wall.

For the purpose of the present invention core ice content and the proportion thereof that is intra-cellular or extra-cellular in its formation is defined by the following method using low temperature scanning electron microscopy.

Vegetable samples sealed in polythene bags and having been stored at −80° C. and kept cold during analysis by transferring them to the Scanning electron microscopy laboratory in an insulated box containing carbon dioxide. 5 mm×5 mm×10 mm sub-samples were cut from the chosen vegetable using a liquid nitrogen pre-cooled scalpel blade wherein cutting was carried out on an aluminium plate sitting on a bed of solid carbon dioxide to maintain sample temperature.

These sub-samples were mounted on to a 7 mm conical depression in a 10 mm diameter aluminium scanning electron microscope stub using Tissue-Tek compound (available from Sakura and comprising <11% polyvinyl alcohol, <5% carbowax and at least 85% non-reactive ingredients) at the point of freezing and immediately plunged in to nitrogen slush. The stub and sub-sample was liquid nitrogen pre-cooled and mounted on a holder and transferred to an Oxford Instruments CP2000 low temperature preparation chamber pumped with an Edwards 306 vacuum station ($5\times10^{-7}$ Torr) via an airlock. The sample was allowed to warm to −95° C. and then fractured using the point of a scalpel blade. After etching the ice for 5 minutes the sample was cooled to −110° C. and coated with Gold/Palladium (6 mA, 6×10−1 mBar Argon, 20 seconds). The vacuum was allowed to recover to $5\times10^{-7}$ Torr and the sample transferred to a Cressington Instruments cold stage in a JEOL 6301F Low Temperature Field Emission Scanning Electron Microscope using an airlock transfer device.

Samples were examined at −150° C. and ice was identified as etched depressions in the fracture surface topography. Images of the intra and extracellular ice were recorded digitally at ×100 and these images then quantified using a Zeiss (Imaging Associates) KS 400 Image Analysis system. Intracellular and extracellular ice content for the core refers to a % of the total ice observed in an image as being located within and outside the cell walls respectively.

SUMMARY OF THE INVENTION

It is a first aspect of the invention to provide a process for the production of a frozen vegetable or part thereof, wherein said process comprises the steps:

(i) heat treating a vegetable or part thereof;
(ii) under-cooling to a maximum core temperature of less than or equal to −5° C.;
(iii) reducing the core temperature to less than or equal to −18° C.;

It is a second object of the invention to provide a frozen vegetable or part thereof comprising a core ice content, characterised in that at least 40% of said core ice content is located within a plurality of cellular structures, wherein the perimeter of each cellular structure is defined by a cell wall.

DETAILED DESCRIPTION

For the purpose of this invention the heat treatment step is sufficient to destroy the cell membranes within the vegetable material and by so doing provides a uniform solute concentration across the tissues as free diffusion equilibrates solute levels. This is a necessary precursor to subsequent cooling steps in the process as any variation in solute concentration will give rise to relative variation in the temperature at which freezing will occur and thereby reduce the ability to achieve effective under-cooling.

The heat treatment of vegetables can also perform a number of other functions by providing pasteurisation of the vegetable material and deactivation of enzymes that accelerate vegetable spoilage such as lipoxygenases.

Preferably heat treatment is undertaken by blanching as this results in the destruction of cell membranes and the inactivation of some or all of the endogenous enzymes present. It is well within the abilities of the person skilled in the art to provide heat treatments and blanching methods which are suited to the stated purpose, the precise details of which will depend on the nature and size of the vegetable concerned.

Under-cooling 'the core' of the vegetable (as defined above) or part thereof to a maximum temperature of less than or equal to −5° C. ensures that enough heat has been removed from the material to allow rapid and uniform initial ice formation in the freezing step (iii) and thereby provide a significant reduction in extracellular ice formation. Preferably the vegetable or part thereof is under-cooled to a temperature from −5 to about −15° C., most preferably from −7 to −12° C. It has been shown that merely reducing the core temperature to −1 or −2° C. without further under-cooling is not sufficient for the rapid initiation of freezing needed for the desired reduction in extracellular ice and consequent product benefit.

In order to under-cool effectively, without initiating ice crystal formation, the temperature difference between the centre of the core and the surface of the vegetable or part thereof must be kept to a minimum.

It has been shown herein that temperature differences between core and surface at the point of initiation of ice formation can vary significantly with conventional approaches to freezing. With the conventional rapid blast freezing, when the surface of the vegetable material reaches 0° C. and ice formation starts, the core is much warmer and the initiation of ice formation in this region starts much later.

Conventional wisdom accepts that the quicker the temperature drops during freezing, the more rapidly freezing occurs and the more favourable the vegetable properties achieved. Commercial preparation of frozen vegetables has therefore sought to speed up the cooling rates of commercial freezing equipment. It is counter intuitive and therefore surprising to now find that where the rate of cooling is slowed to achieve a defined level of under-cooling within the vegetable core initiation of freezing can be induced throughout a product almost instantaneously.

In accordance with the present invention there is provided a process wherein the rate of cooling is slowed sufficiently to achieve only a small temperature difference between core and surface and thereby induce under-cooling at the core of the vegetable material to a maximum temperature of less than or equal to −5° C. Ice formation with further temperature reduction can then occur throughout the vegetable material at approximately the same time. This has been found to result in a higher proportion of ice crystal formation within the cell structures defined by the cell walls i.e. intracellular ice and more favourable vegetable properties when consumed.

The temperature difference between the core and surface, and also within the core itself is dependent on the rate of cooling of the vegetable material. Rate of cooling is in turn dependant on the size of the vegetable material to be frozen and the surface area that it exhibits. It is believed to be within the capability of the person skilled in the art to decide on an appropriate cooling rate to achieve under-cooling to maximum core temperature of less than or equal to −5° C. for a vegetable of a particular size and surface area.

Sensory analysis has confirmed that both the appearance and the texture of vegetables prepared according to the present invention show improvement over the conventional freezing methods known in the art and the results obtained closely resemble those for fresh unfrozen vegetables. In particular the firmness and waxiness of vegetables according to the invention are significantly improved over frozen vegetables known in the art.

To ensure effective under-cooling it is preferred that the cooling rate utilised for the process of the invention maintains maximum and minimum temperatures between the surface and the core within 6° C. of each other, preferably less than or equal to 3° C., most preferably less than 1.5° C. of each other e.g. two temperature probes are inserted into a potato which is being cooled according to the invention, a first at 10 mm from the surface of a potato tuber and the second in the centre tuber; when the first probe detects a temperature of 0° C. the second should read less than or equal to +6° C., preferably less than or equal to +3° C., most preferably less than +1.5° C.

Preferably the vegetable material will be cooled in a blast freezer wherein the freezer set-point is progressively reduced according to the following regime:

55–65 minutes at 0° C.
25–35 minutes at −5° C.
10–20 minutes at −10° C.
10–20 minutes at −12.5° C.
70+minutes at −30° C.

Most preferably the vegetable material will be frozen in a blast freezer wherein the freezer set-point is reduced according to the following regime:

| 60–70 minutes at −12° C. | downwards airflow about 1 m/s |
| 25–35 minutes at −30° C. | downwards airflow about 4.5 m/s |

The temperature at which initiation of freezing occurs in step (iii) will depend on the nature of the vegetable that is being subjected to this freezing process, the rate at which cooling continues below −5° C. as well as the presence or absence of nucleating agents. Initiation of freezing may occur at any point when the temperature within the core is at a maximum of less than −5° C. Typically for the purpose of the invention initiation of freezing will occur when the temperature within the core is at a maximum temperature of from −7° C. to −12° C.

A first embodiment of the invention relates to a process according to claim 1 wherein at least 40% of ice formation within the core of said vegetable or part thereof in step (iii) occurs within a plurality of cellular structures, wherein the perimeter of each cellular structure is defined by a cell wall. Preferably at least 60% of said ice formation occurs within said plurality of cellular structures, more preferably 80%. Most preferably 90% of ice formation at the core of said vegetable or part thereof occurs within said plurality of cellular structures.

In a vegetable prepared according to the present invention it is preferred that at least 60% of said ice formation occurs within said plurality of cellular structures, more preferably 80%. In a most preferred embodiment 90% of ice formation at the core of said vegetable or part thereof occurs within said plurality of cellular structures as these vegetables most closely resemble the appearance and texture of fresh vegetables.

The effect of extra-cellular ice formation on the cellular structure of the vegetable material has been demonstrated, wherein the cavitation in thawed vegetables caused by extra-cellular ice growth has been quantitatively evaluated.

Measurements were carried out to demonstrate the differences in the disruption of the cellular structures in thawed vegetables between conventional freezing and freezing by a process of the invention.

Fixation Method: The tissue pieces were received already thawed. They were transferred to fixative, formol-acetic alcohol (FAA) at room temperature and left to fix for not less than 72 hours.

Embedding & Sectioning: After fixation, the tissue pieces were dehydrated and embedded in paraffin wax. They were then sectioned to a nominal thickness of 5 μ, and mounted on glass slides.

Sections were cut through the tissue pieces which had been subjected to the different freezing treatments. Three images were selected from each section, two from opposite sides of the tissue section (avoiding tissue very close to the edge of the section) and one image from near the middle. Care was taken to ensure that there was no overlap between the fields.

For image enhancement the images were first converted to B/W (8-Bit) format and image contrast was greatly increased by carrying out a 100 pixel value downfield shift of the entire image, followed by re-ranging it back to its full dynamic range (pixel value range 0–255). This left the cell walls a very dark grey and the remainder of the image a very light grey.

The ice cavities were identified by eye from their morphology. Using the 'magic wand' range selector, set to a tolerance of +15, with the contiguity control switched on, the cavities were selected manually and filled with white (pixel value=255). The remainder of the image was rendered black (pixel value=0).

Measurements were done on a Kontron KS300 image analyser. The total number of pixels in the ice cavities were counted (measured as a filled area—i.e. treating any small inclusions within the cavities as if they were not there), added together and expressed as a percentage of the pixels in the entire image. FIGS. 7 & 8 illustrate images.

For the purpose of the present invention a vegetable or part thereof may be selected from the group comprising potato, swede, turnip, pumpkin, onion, broccoli, tomato, zucchini, aubergine, water chestnut, pepper, mushroom, peas, carrot, spinach and sugar-snap peas. Most preferably said vegetable or part thereof is potato.

Vegetable or parts thereof according to the present invention can be readily used in a variety of commercial catering or domestic frozen food products. In particular vegetables of the present invention are ideally suited to frozen ready prepared meals where their superior texture considerably improves the product quality. Therefore in a further aspect the invention relates to the use of a vegetable of part thereof as described above in a frozen meal.

EXAMPLE 1

Preparation of Frozen Potato for Quantitative Evaluation of Intra-Cellular and Extra-Cellular Ice Content Using Low Temperature Scanning Electron Microscopy Frozen potato tuber samples in sealed polythene bags that had been stored at −80° C. were kept cold by transferring them to the Scanning electron microscopy laboratory in an insulated box containing carbon dioxide.

Approximately 5 mm×5 mm×10 mm sub-samples were cut 10 mm from the outer edge of each tuber using a liquid nitrogen pre-cooled scalpel blade. Cutting was carried out on an Aluminium plate sitting on a bed of solid carbon dioxide to maintain sample temperature. Sub-samples were mounted on to a 7 mm conical depression in a 10 mm diameter Aluminium scanning electron microscope stub using TissueTek compound at the point of freezing and immediately plunged in to Nitrogen slush. The stub+sample was mounted on to a holder and transferred to an Oxford Instruments CP2000 low temperature preparation chamber pumped with an Edwards 306 vacuum station ($5 \times 10^{-7}$ Torr) via an airlock. The sample was allowed to warm to −95° C. and fractured using the point of a scalpel blade. After etching the ice for 5 minutes the sample was cooled to −110° C. and coated with Gold/Palladium (6 mA, 6×10−1 mbar Argon, 20 seconds). The vacuum was allowed to recover to $5 \times 10^{-7}$ Torr and the sample transferred to a Cressington Instruments cold stage in a JEOL 6301F Low Temperature Field Emission Scanning Electron Microscope using an airlock transfer device.

Samples were examined at −150° C. and ice was identified as etched depressions in the fracture surface topography. Representative images of the intra and extracellular ice were recorded digitally at ×100 and these images then quantified using a Zeiss (Imaging Associates) KS 400 Image Analysis system. (FIGS. 1 and 2)

Intracellular ice was expressed as a % of the total ice observed in the images. Results table 1.

TABLE 1

| Sample taken 15 mm into potato | Cooling method | Extra-cellular ice observed | Intra-cellular ice observed | Total ice observed | % intra-cellular ice | % extra-cellular ice |
|---|---|---|---|---|---|---|
| Charlotte tuber | Standard blast | 89 | 0 | 89 | 0 | 100 |
| Charlotte tuber | EP 554468 | 74 | 4 | 78 | 5 | 95 |
| Charlotte tuber | Invention control cooling | 2 | 75 | 77 | 97.4 | 2.6 |

For Conventional Blast Freezing the blast freezer was set to −30° C. throughout the freezing process.

For cooling according to the present invention the blast freezer was initially set to 0° C. After the samples were introduced the freezer set-point was progressively reduced according to the following:

60 minutes at 0.0° C.
30 minutes at −5.0° C.
15 minutes at −7.5° C.
15 minutes at −10.0° C.
15 minutes at −12.5° C.
75 minutes at −30.0° C.

Results

Figure 1A:
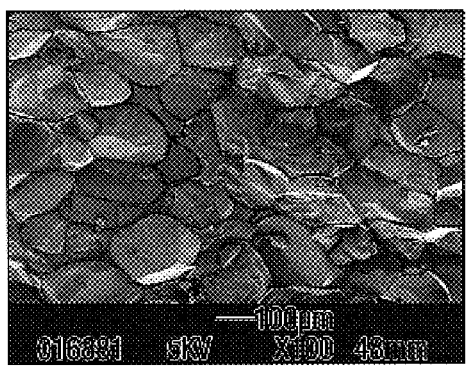
FIG. 1: shows a series of images of a potato sample prepared in accordance with the process of the present invention; wherein,
(a) is a low temperature scanning electron microscope image;
(b) shows image (a) wherein intracellular ice has been outlined;
(c) shows a binary image of extra-cellular ice;
(d) shows a binary image of intracellular ice.
Figure 1B:
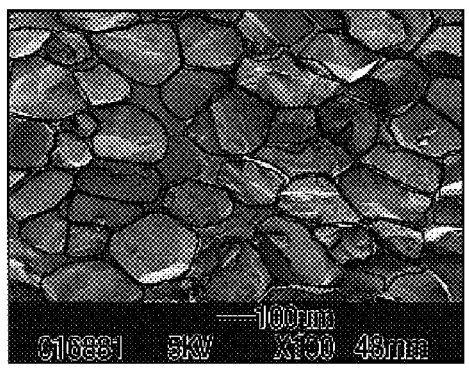
Figure 1C:
Figure 1D:
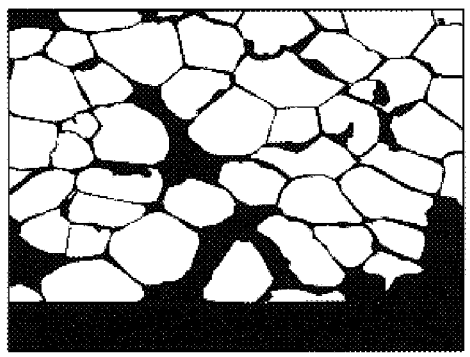
Figure 2A:
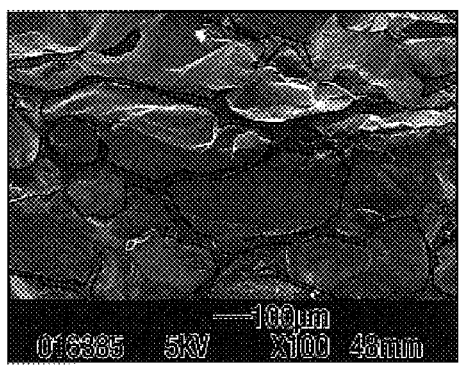
FIG. 2: shows a series of images of a potato sample prepared in accordance with the process of European Patent 0 554 468; wherein,
(a) is a low temperature scanning electron microscope image;
(b) shows image (a) wherein intracellular ice has been outlined;
(c) shows a binary image of extra-cellular ice;
(d) shows a binary image of intracellular ice.
Figure 2B:
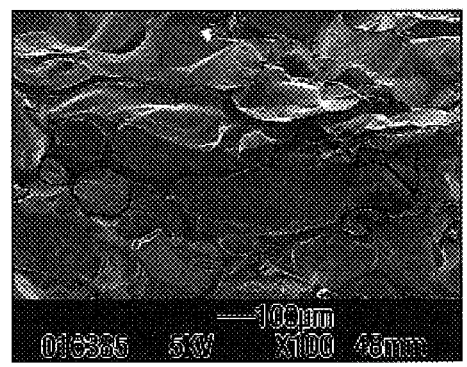
Figure 2C:
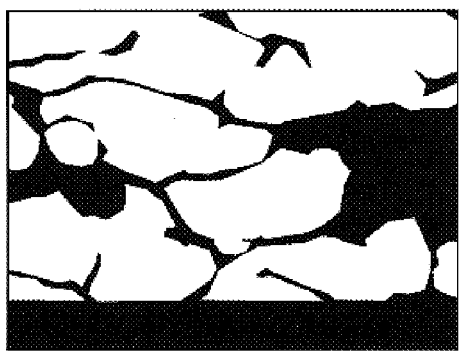
Figure 2D:
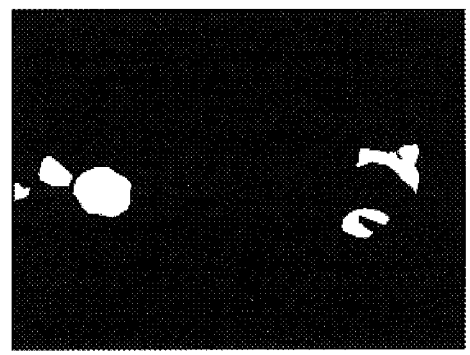
Figure 3:
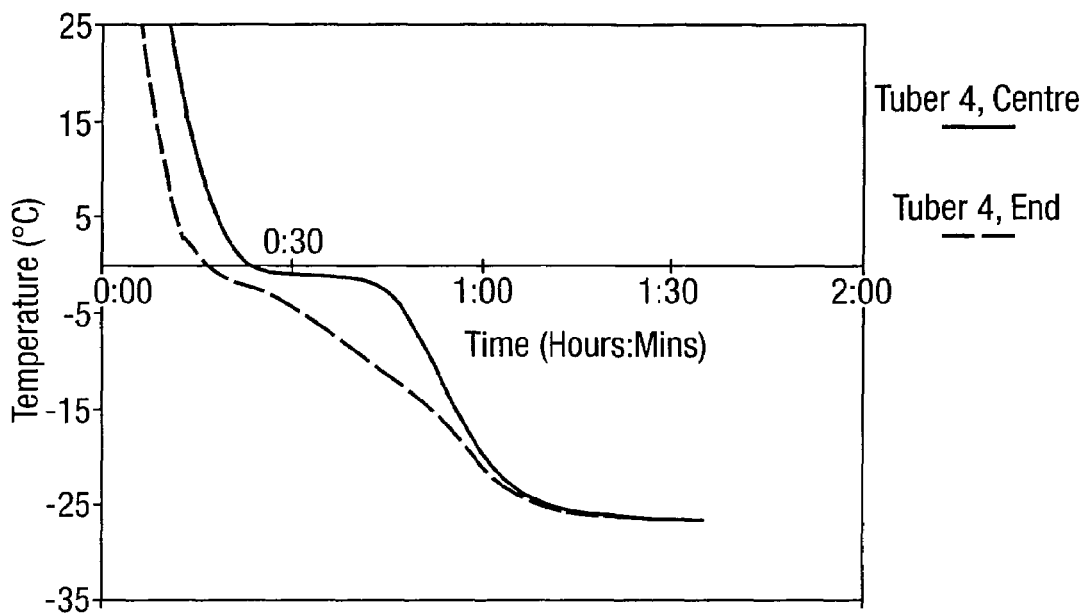
FIG. 3: shows a temperature profile for a conventional blast freezing process over time.
Figure 4:
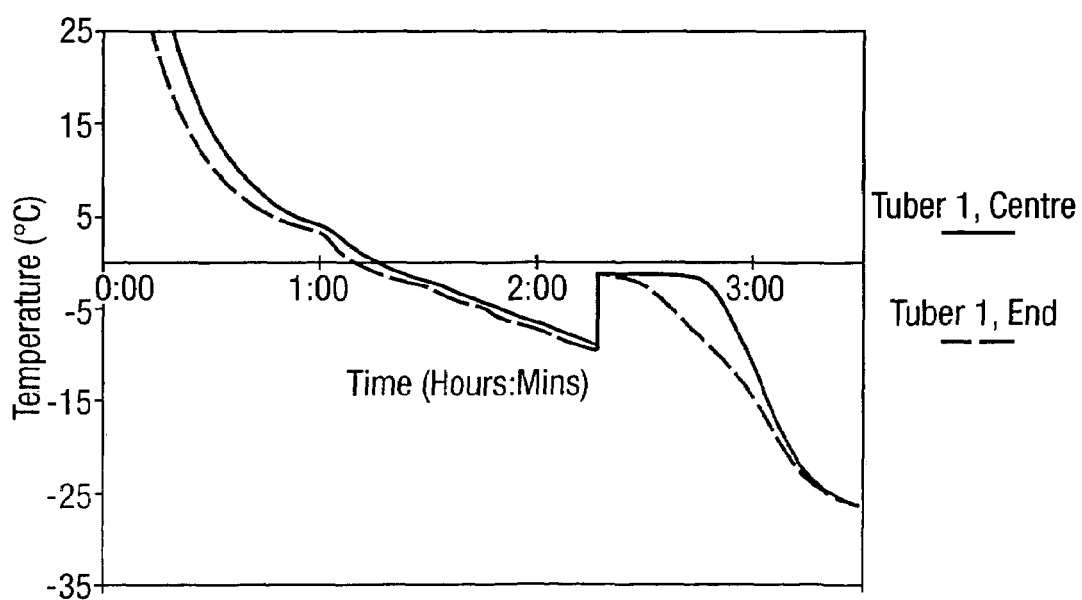
FIG. 4: shows temperature profile for a cooling regime according to the present invention.

The temperature profiles during cooling are illustrated by FIGS. 3 and 4.

The temperature measured at the centre of the tuber at the moment (±10 sec) the temperature in the outer regions drops to 0.0° C. (weight of individual tuber in brackets):

In Conventional Blast Freezing

| | |
|---|---|
| 8.5° C. | (37.7 g) |
| 12.5° C. | (35.0 g) |
| 9.5° C. | (28.1 g) |
| 7.4° C. | (20.8 g) |

Mean temperature variation=9.5° C.

In Cooling according to the invention.

| | |
|---|---|
| 1.6° C. | (37.9 g) |
| 2.7° C. | (34.6 g) |
| 1.3° C. | (31.1 g) |
| 0.9° C. | (30.6 g) |
| 1.4° C. | (23.8 g) |
| 0.8° C. | (20.2 g) |

Mean temperature variation=1.45° C.

EXAMPLE 2

Temperature Differentials Within Potato Tubers During Freezing Processes

Potato tubers (cv.Nicola) in the weight range 20 to 40 g were selected. The average dimensions of the tubers were 48 mm×35 mm×29 mm. The tubers were blanched by heating with steam for 10 minutes. The tubers were transferred to a blast freezer set to the appropriate temperature (see below). Two thermocouple probes were inserted into each tuber, one into the centre of the tuber and the other about 1 cm into one end of the tuber. The temperatures were logged every 10 seconds during the freezing process.

EXAMPLE 3

Texture and Appearance Sensory Assessment of Products According to the Invention.

Potato samples were prepared using four different freezing processes. The potatoes used for processing were cv. Nicola tubers (origin UK) supplied by MBM Ltd, Chatteris. The cv. Nicola potatoes were chosen merely for their ready availability and their small size (graded −35 mm). The samples were further graded by hand, with tubers in the weight range 20 g to 40 g being selected, variability in both processing and panel assessment can be reduced by selecting a narrow range of tuber sizes.

(i) The first processing method used was that of Conventional (Blast) Freezing as would typically be used in industry for processing vegetables in general. The potatoes (4 kg batch size) were steam blanched for 10 minutes and then cooled with cold water for 10 minutes to ambient temperature before being deep-frozen in a blast freezer operating at −30° C.

(ii) The second method used a Montford Environment Test Chamber. This programmable piece of apparatus is capable of producing very finely controlled temperature gradients in a reproducible manner. The programme used gives rise to a linear gradient down from +10° to −30° C. over 16 hours. The potatoes (4 kg batches) were steam blanched for 10 minutes but were then air-cooled for just 2 minutes before being transferred, whilst still hot, to the Montford chamber. They were then frozen using the 16 hour gradient programme.

(iii) The third processing method was that disclosed in EP 554 468. It was found that a blast freezer could deliver an adequate degree of the control required at the various set-points mentioned in the preferred embodiment thereof. This regime consisted of the following steps:
15 minutes at 0° C.
15 minutes at −5° C.
15 minutes at −15° C.
90 minutes at −20° C.
30 minutes at −30° C.

The potatoes (4 kg batches) were steam blanched for 10 minutes then air-cooled for 2 minutes before being transferred, whilst still hot, to the blast freezer. They were then frozen using the process regime of EP0554468B1.

(iv) The fourth processing method was a method according to the invention that aimed to maximise the degree of undercooling experienced by tubers in the blast freezer.
60 minutes at 0° C.
30 minutes at −5° C.
15 minutes at −7.5° C.
15 minutes at −10° C.
15 minutes at −12.5° C.
75 minutes at −30° C.

The potatoes (4 kg batches) were steam blanched for 10 minutes then air-cooled for 2 minutes before being transferred, whilst still hot, to the blast freezer. They were then frozen using the above regime.

Following preparation the frozen samples were all stored in a −25° C. walk-in freezer. The samples were in storage for less than 8 weeks before sensory assessment.

Scope of the Panel

Within the sensory studies it was recognised that the nature of the potato raw material meant that the samples would be inherently variable and steps must be taken to minimise variability so that within sample variability would be smaller than between sample variability.

The scope of the panel must be defined before training begins in order to select appropriate raw material for training and the subsequent processing and sensory trials. The scope encompasses such parameters as potato variety, product format (whole, slice, mash), sample range (fresh, frozen) etc.. The scope of this panel was defined as:

| Raw material |
| --- |
| Single variety |
| Single batch |
| Size-graded (20–40 g) |
| Whole tubers |
| Set skins |
| Prepreparation |
| Unpeeled |
| Blanch (10 min, peroxidase negative) |
| Sample set |
| Fresh |
| Frozen (processes (i)–(iv)) |

Reheat
 To provide optimum quality (different regimes for fresh and frozen) Boil in salted water Raw Material
 Small potatoes are normally available from the supermarkets throughout the year, sold as "salad potatoes" with set skins (i.e. the potatoes are held in the ground for a several weeks after the top growth has been removed. This allows the skins to form fully and the potatoes will then survive prolonged storage at chill temperatures). These potatoes can be grown in various parts of Europe (UK, France, Spain) depending on the season, commonly available varieties are Nicola, Charlotte, Maris Peer.

"New" potatoes are available in the UK during the months of June-August with "fluffy" skins (i.e. the potatoes are lifted as available without allowing the skins to set, these potatoes are not intended for prolonged storage).

The need to develop processes and train/use the panel throughout the year meant that potatoes with set skins were used for both training and the trials.

Training
 14 panellists were drawn from a pool of trained assessors who have been screened and selected for their sensory acuity—including identification of the basic tastes, odours and descriptive ability.

At the outset the panel was asked to look for differences between the sample treatments, with particular emphasis on textural differences, rather than providing an extensive descriptive profile for each sample. As each sensory trial was planned to examine treatments within a specific variety rather than across varieties this meant that it was not necessary to generate extensive vocabulary describing small differences.

During the initial training sessions the panel were exposed to the range of potato materials (particularly in terms of texture) they were likely to encounter during future studies, although it was difficult to source truly "waxy" potatoes outside the "new" potato season.

The panel consists of two separate assessments: "Appearance" and "Texture". Despite steps taken to reduce the inherent variability of the raw material (see scope above) there were still problems of within sample variability and various strategies were adopted to reduce this variability as much as possible:

Panellists were provided with two tubers to assess texture. Samples from some treatments were so variable that the two tubers looked obviously different (i.e. one intact and the other broken up). The panellists were instructed to assess the sample which was the most intact but to note down any variation—this gave additional information for validation and analysis of the results.

It was necessary to carry out appearance separately from the remainder of the assessment because variability in some of the samples made it difficult for individual panellists to make an overall assessment on only two tubers. An alternative method was adopted to assess appearance—appearance was assessed by each panellist looking at the same plateful of tubers (8 tubers cut in half) and making an overall judgement on this sample.

Sensory Panel Methodology

The trials used a 5 from 5 design where each panellist received each of five treatments, over a total of 3 sessions. Randomised designs were prepared for both trials such that each sample was tasted 36 times for both trials.

The panellists received a standard reference product at the beginning of each day's session.

The Texture assessment was carried out in sensory booths under white lights and data captured electronically. The Appearance assessment was carried out under white lights and the data collected.

Panellist Monitoring

There are a series of data and panellist monitoring techniques which are regularly performed on all sensory output. The objective of these monitoring procedures is to check whether the panellists give reproducible and discriminative results. Both performance of the whole panel and of each individual panellist are analysed. We ascertain whether the panellists scores are repeatable over the same sample on each attribute, whether there is good agreement among the whole panel, and whether the definitions of the attributes are well understood by all panellists.

No skewness or kurtosis apparent, therefore a normal distribution of data was achieved. Replication was good, all samples received at least 30 replicate assessments. Reproduciblity and individual discrimination was good for aroma, flavour, texture and appearance.

The results of each of these techniques indicated that the mean scores and multiple comparisons analysis could be treated with confidence. The mean scores are shown below.

Assessment Procedure

Panellists given 2 tubers with the following instructions— if the two tubers look very different, assess the most intact tuber and note down any differences.

All assessments carried out under white lights

| | |
|---|---|
| Attributes 1–6 | Assessed in sensory booths |
| Attribute 1 | Insert point of table knife into tuber |
| Attributes 2–6 | Assessed on one tuber, a second tuber available if required |
| Attributes 7–10 | Assessed by each panellist looking at the same plateful of tubers (8 tubers cut in half) and making an overall judgement on this sample. |

Open

| | | |
|---|---|---|
| 1. | Firmness to cut | How firm the sample is when cut with a knife |

Texture

| | | |
|---|---|---|
| 2. | Firmness | Assessed after 3 chews with the side teeth |
| 3. | Rate of breakdown | How quickly the sample breaks down in the mouth |
| 4. | Waxy | How waxy the sample is, a clean/firm bite, fragments |
| 5. | Moistness | How moist the sample feels in the mouth |
| 6. | Dryness | How dry the sample feels in the mouth, saliva is required to moisten the sample |

Appearance

| | | |
|---|---|---|
| 7. | Uniformity | The uniformity of the whole sample, taking everything into account |
| 8. | Intactness cut surface | How intact the sample appears |
| 9. | Skin intactness | Whether the skins are intact or split |
| 10. | Waxiness | How waxy the sample appears (moist, translucent, shine) |

Sensory data

Adjusted mean scores (significant attributes only)

| PRODUCT CODE | FR | BL | NE | PI |
|---|---|---|---|---|
| Appearance | | | | |
| Uniformity | 6.31 | 2.58 | 3.39 | 5.60 |
| Intactness Cut Surface | 5.87 | 1.57 | 3.09 | 5.02 |
| Skin Intactness | 6.34 | 1.26 | 3.44 | 5.63 |
| Waxiness | 4.51 | 1.25 | 2.37 | 3.38 |
| Firmness To Cut | 5.56 | 2.15 | 3.11 | 5.03 |
| Texture | | | | |
| Firmness | 5.87 | 1.72 | 3.04 | 4.88 |
| Rate Of Breakdown | 3.68 | 7.03 | 6.13 | 4.18 |
| waxy | 4.22 | 0.94 | 1.87 | 2.96 |
| Dryness | 3.87 | 4.21 | 4.67 | 4.81 |

FR = Fresh, unfrozen
DL = Conventional blast frozen
NE = EP 0 554 468 B1 method
PI = Process of the invention Thybo A. K and Martens M. Food Quality and Preference 11 (2000) 283–288. Analysis of sensory assessors in texture profiling of potatoes by multivariate modelling.

EXAMPLE 4

A Simplified Cooling Regime To Achieve Sufficient Undercooling of Blanched Potatoes Potato tubers (cv. Charlotte, Origin Spain) in the weight range 25 to 30 g were selected. The tubers had been size graded such that they were in the 30 to 35 mm range. The tubers were blanched by heating with steam for 12 minutes. The tubers were transferred to an air blast freezer set to the appropriate temperature. Needle thermocouple probes were inserted into the core of each tuber. Temperatures were logged every 15 seconds during the freezing process.

For cooling according to the present invention the air blast freezer was initially set to −12° C. After the samples were introduced the freezer set-point was progressively reduced according to the following regime:

| | |
|---|---|
| −12° C. for 63 minutes | Downwards Air Flow of 1 m/s approx. |
| −30° C. for 27 minutes | Downwards Air Flow 4.5 m/s approx. |

Figure 5:
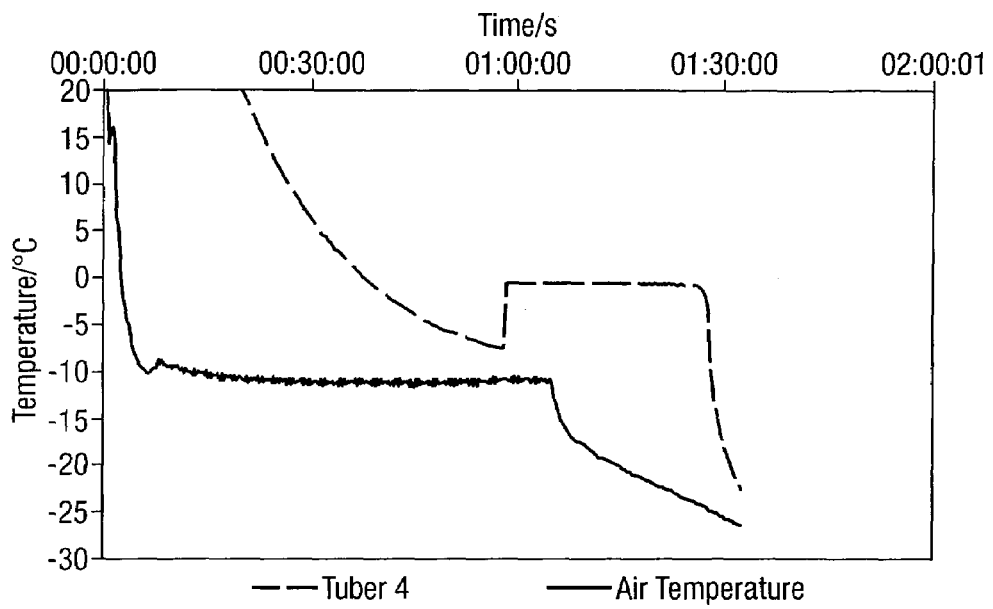
FIG. 5: shows a temperature profile of a simplified cooling regime according to the present invention.

Undercooling to less than −5° C. as illustrated by FIG. 5.

EXAMPLE 5

Figure 6:
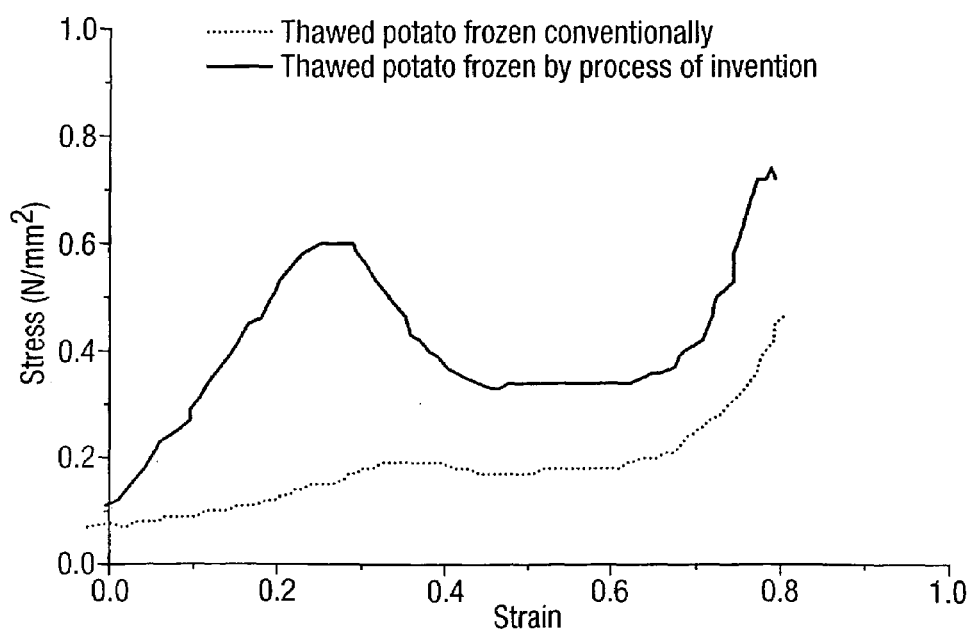
FIG. 6: shows compressive mechanical tests of frozen potatoes.
Figure 7A:
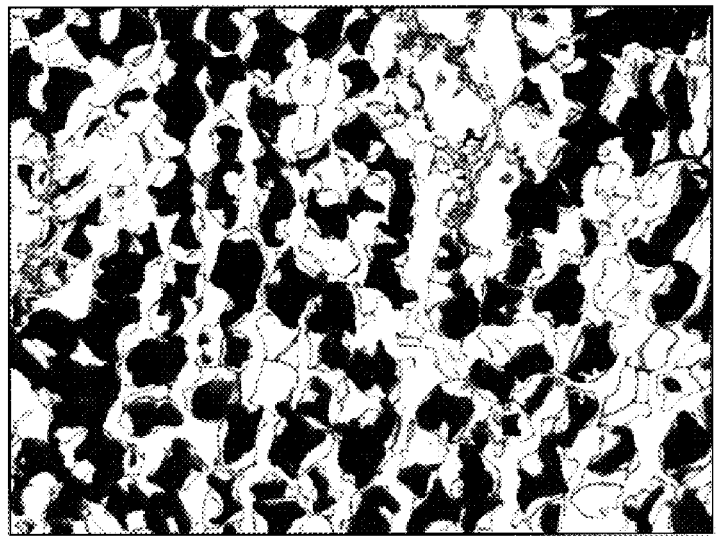
FIG. 7: illustrates cavities in blanched potato after thawing wherein:
(a) shows a blast frozen potato stained with safranine/iodine;
(b) shows image (a) after segmentation;
(c) shows potato frozen in a process according to the invention and stained with safranine/iodine;
(d) shows image (c) after segmentation.
Figure 7B:
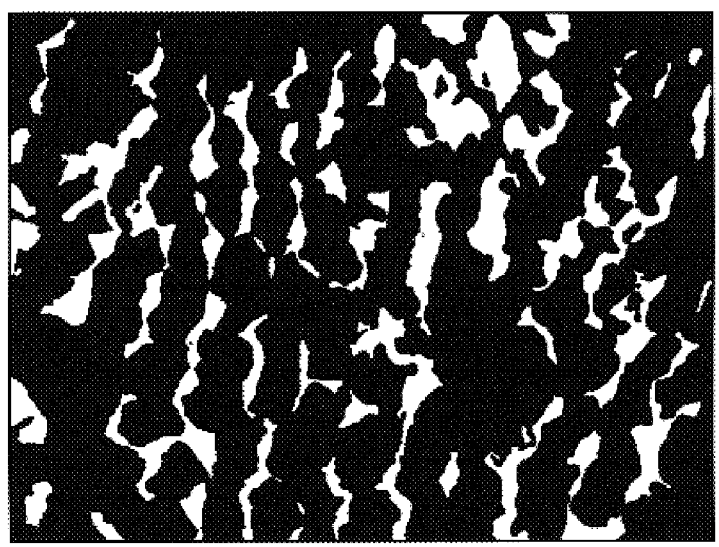
Figure 7C:
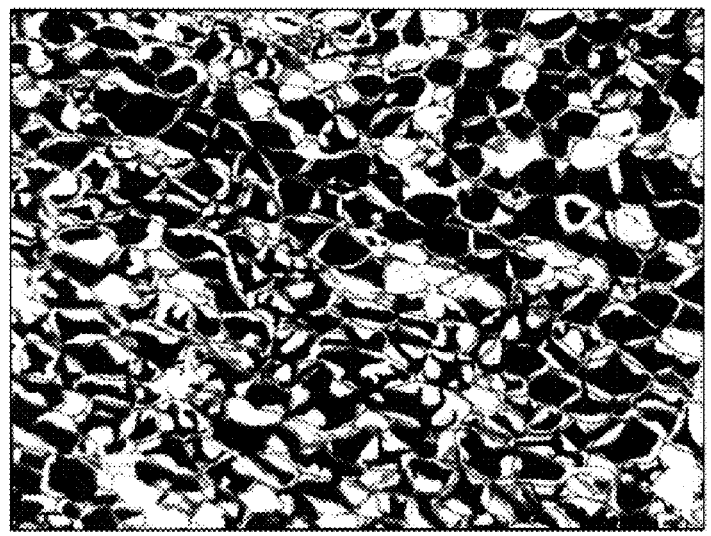
Figure 7D:
Figure 8A:
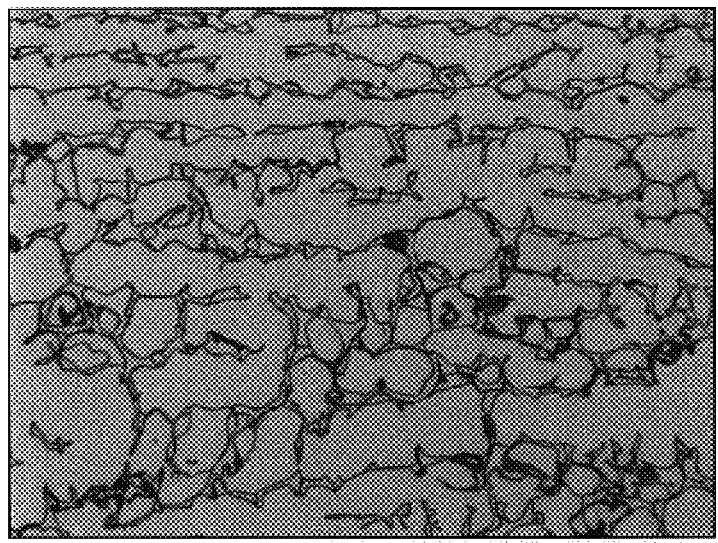
FIG. 8: illustrates cavities in blanched and thawed onion wherein:
(a) shows a blast frozen onion stained with safranine/iodine;
(b) shows image (a) after segmentation;
(c) shows onion frozen in a process according to the invention and stained with safranine/iodine;
(d) shows image (c) after segmentation.
Figure 8B:
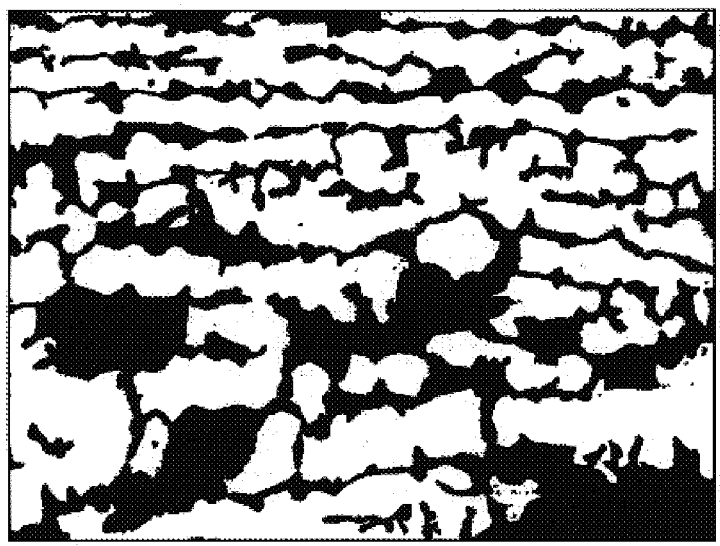
Figure 8C:
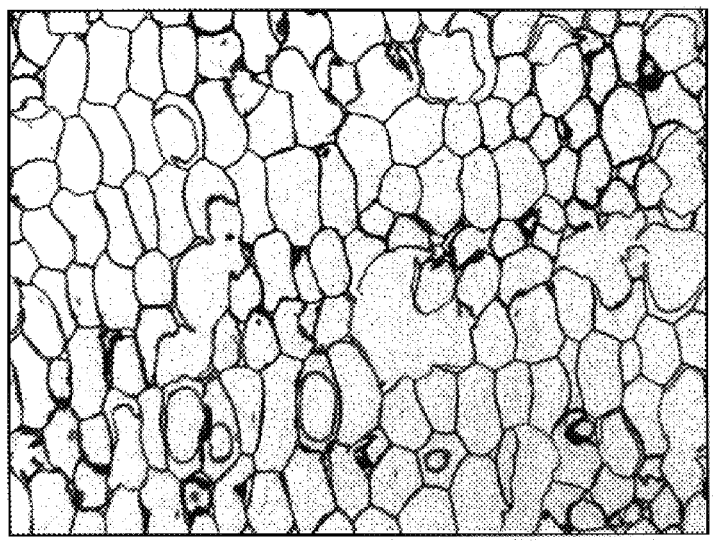
Figure 8D:
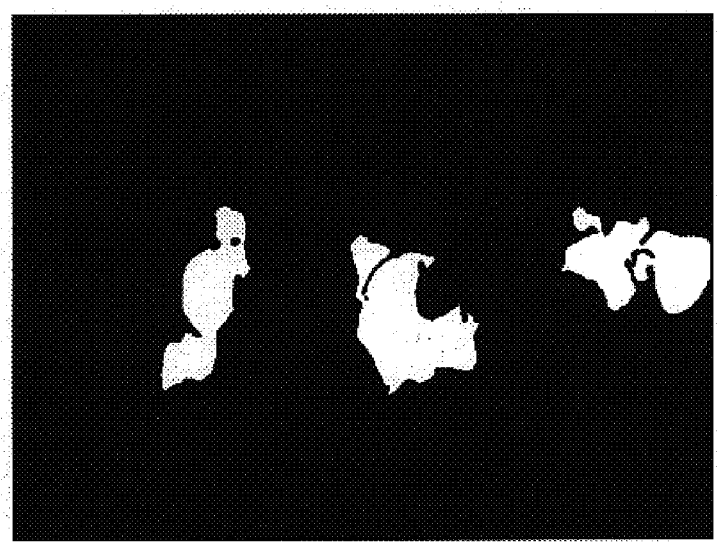

Compressive Mechanical Tests of Potatoes Frozen According to a Process of the Present Invention The plots of FIG. 6 show typical compressive mechanical tests on pieces of potato cut from whole potatoes that had been blanched, frozen by conventional blast & by a process of the invention, then thawed (by immersion in ambient water).

The compressive mechanical tests were performed on 1 cm cubes of tissue cut from the centres and edges of the thawed whole potato. The tests were performed at a cross-head speed of 2400 mm/min using an ESH Servo-Hydraulic Rig. The dimensions of the cubes were measured prior to compression in order to convert the force-displacement data into stress-strain. FIG. 6 shows that the stiffness (initial gradient), strength (max. stress prior to failure) and energy to failure (area under curve prior to failure) are greater for the thawed tissue frozen by the process of the invention, rather than the conventionally blast frozen tissue. These mechanical parameters are known to relate to the perceived in-mouth texture (firmness) of the tissue.

EXAMPLE 6

Visualisation of Ice Formation in Potato Tissue By Magnetic Resonance Imaging

The potatoes used in this study were standard Desiree potatoes from Sainsburys, UK. A 1 cm thick slice was cut across the middle of the potato, from which an ~8 mm plug was cut with a cork borer. Samples were blanched in boiling water for 2 minutes followed by plunging in cold water. All samples were then placed in 10 mm O.D. NMR tubes.

2-D MRI images were acquired on a Bruker DSX 300, equipped with a standard micro-imaging accessory with a 15 mm birdcage resonator. Images were acquired using a fast gradient echo method (GEFI). Typical parameters used were a 1.5 cm field of view (F.o.V.), with a 128*128 image matrix giving ~120 µm in-plane pixel resolution. The slice thickness studied was 1 mm. The echo spacing used was 5 ms with a 100 ms recycle delay. The total image acquisition time was 12 s. Generally two orthogonal images were acquired simultaneously, one in the vertical direction and one horizontally. Temperature was controlled using the standard Bruker temperature control unit using pre cooled nitrogen gas at a flow rate of 1070l/h. For the conventional freezing examples the sample was initially equilibrated at 0° C. in the spectrometer before the temperature was rapidly reduced to −30° C. Acquisition was started immediately with data recorded every 30 s. For the undercooling examples samples were equilibrated at 0° C. before the temperature was decreased in 1° C. steps every 20 minutes. Images were not acquired during the initial cooling, but were collected every 30 s at the lower temperatures. The temperature profile of some of the samples was recorded during the imaging experiment using a Luxtron 790 Fluoroptic thermometer, which was initially calibrated in an ice water mixture.

Typical MRI images show 2 simultaneously acquired orthogonal images. The dull strip across centre of the image shows the position of the other image slice. The image intensity is thought to reflect the local environment of the water rather than the absolute amount of non-frozen water present.

Figure 9:
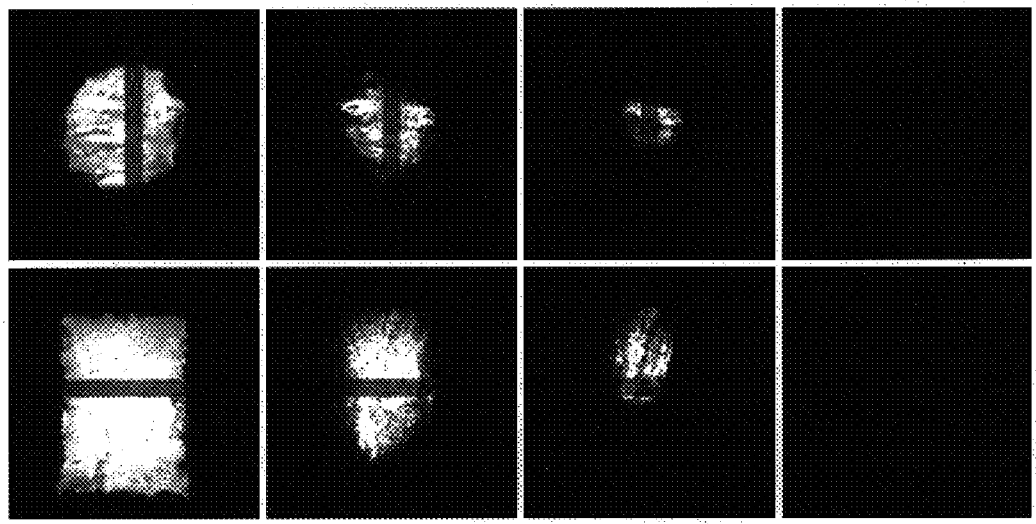
FIG. 9: Images as a function of time showing conventional freezing of blanched potato at −30° C. Top set of images show the horizontal slice, bottom set are the corresponding vertical image.

Images acquired during the conventional freezing (at −30° C.) of blanched potato are shown in FIG. 9. There is an initial loss of signal intensity on the outside of the image suggesting the formation of ice preferentially on the outside of the sample. The images suggest the presence of a temperature gradient across the sample, with ice only forming in the centre of the sample at a later time as a cooling front moves through the sample.

Figure 10:
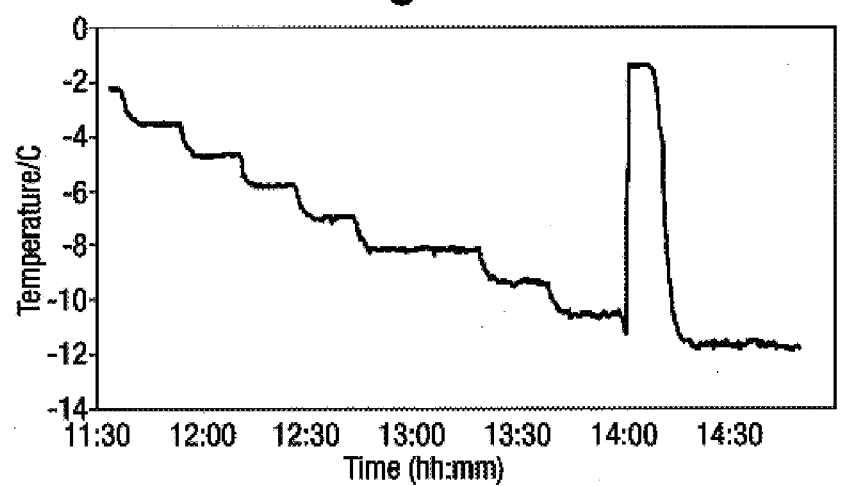
FIG. 10: Temperature profile during the cooling of blanched potato by a process of the invention.

Images were then acquired as a function of time during the controlled cooling of blanched potato. The temperature profile of the potato was also recorded and is shown in FIG. 10. Initially the temperature of the sample decreased in line with the temperature settings of the spectrometer. No changes were observed in the images during this initial cooling period. The temperature profile shows that the sample reached a minimum temperature of about −10° C. before there was a rapid increase in temperature, indicative of ice starting to form after the sample has initially super-cooled.

Figure 11:
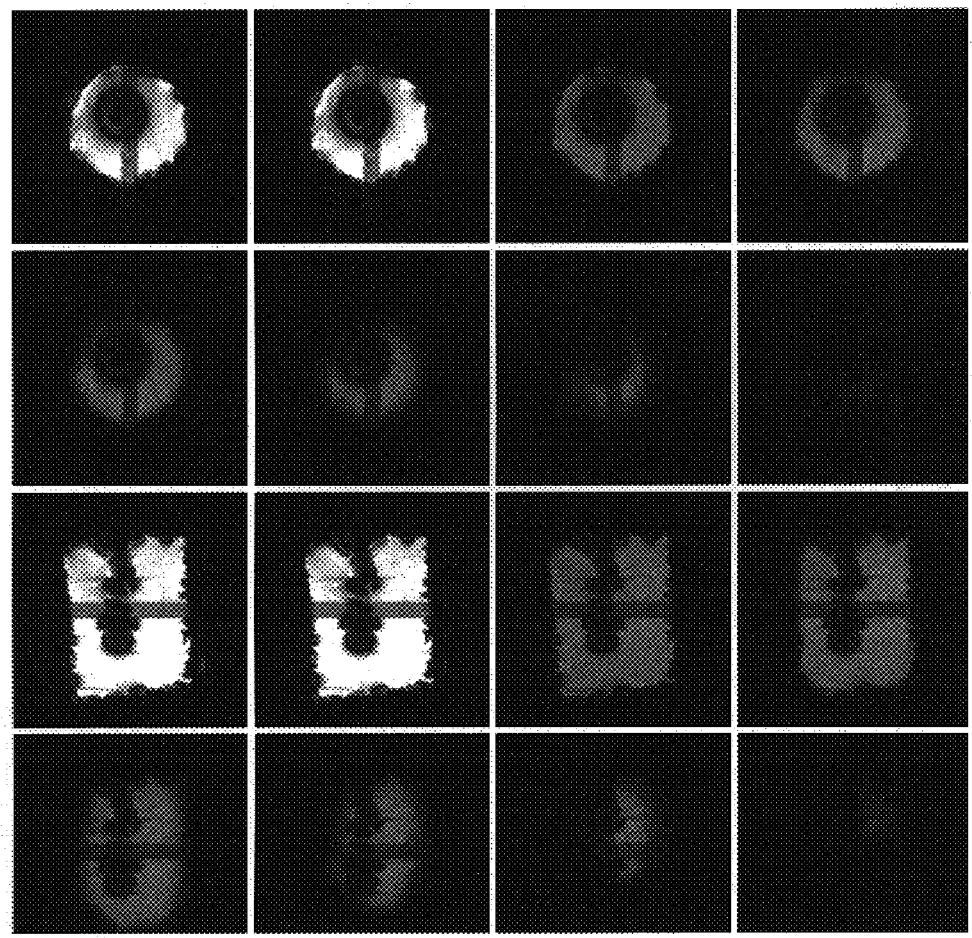
FIG. 11: Images as a function of time during the cooling of blanched potato by a process of the invention. The top set show the horizontal slice, the bottom set are the corresponding vertical images. The large temperature increase occurred between the $2^{nd}$ and $3^{rd}$ images shown. The hole in the centre of the image reflects the position of the thermocouple.

The corresponding images around this temperature change are shown in FIG. 11. The rapid increase in temperature corresponds to a large decrease in image intensity (~50% of the total image intensity) throughout the whole sample. This intensity loss occurred between one image and the next, i.e. within 30 s. These results suggest that the initial ice crystallisation occurred uniformly throughout the whole sample. Following this change, there was a further loss of signal intensity from the outside of the image inwards with further freezing. This suggests a cooling front moved through the sample with further ice formation occurring from the outside of the sample inwards. This freezing period corresponds to the plateau observed in the temperature profile. When all the image intensity was lost the sample temperature was seen to decrease suggesting ice formation was complete. The complete freezing process took about 10 minutes.

The invention claimed is:

1. A process for the production of a frozen vegetable or part thereof, wherein said process comprises the steps:
    (i) heat-treating a vegetable or part thereof to destroy the cell membranes within the vegetable or part thereof;
    (ii) under-cooling the vegetable or part thereof to a maximum core temperature of less than or equal to −5° C.;
    (iii) reducing the core temperature of the vegetable or part thereof to a final temperature less than or equal to −18° C.;
wherein at the final temperature ice crystals are formed at the core of the vegetable and wherein at least 60% of said ice crystals formed at the core of the vegetable are intracellular.

2. A process according to claim 1 wherein said vegetable or part thereof is selected from the group consisting of potato, swede, turnip, pumpkin, onion, broccoli, tomato, zucchini, aubergine, water chestnut, pepper, mushroom, peas, sugar-snap peas, carrot and spinach.

3. A process according to claim 1 wherein said vegetable or part thereof is potato.

4. A process according to claim 1 wherein the vegetable or part thereof has a surface and a core, and wherein under-cooling is carried out at a cooling rate that maintains a maximum temperature and a minimum temperature between the surface and the core within 6° C of each other.

5. A process according to claim 1 wherein at least 90% of the ice formed at the core of the vegetable is intracellular.

* * * * *